United States Patent [19]

Hangauer, Jr.

[11] 4,203,883

[45] May 20, 1980

[54] AQUEOUS COLLOIDAL DISPERSIONS OF TERTIARY AMINE SALTS OF UREA-URETHANE POLYMERS AND METHOD FOR MANUFACTURE

[75] Inventor: David G. Hangauer, Jr., Buffalo, N.Y.

[73] Assignee: Textron, Inc., Providence, R.I.

[21] Appl. No.: 939,667

[22] Filed: Sep. 5, 1978

Related U.S. Application Data

[63] Continuation-in-part of Ser. No. 729,091, Oct. 4, 1976, abandoned.

[51] Int. Cl.$^2$ .............................................. C08L 75/04
[52] U.S. Cl. ..................... 260/29.2 TN; 428/423.1; 528/44; 528/48; 528/51; 528/52; 525/453
[58] Field of Search ................................ 260/29.2 TN

[56] References Cited

U.S. PATENT DOCUMENTS

| | | | |
|---|---|---|---|
| Re. 29,711 | 7/1978 | Wood | 260/29.2 TN |
| T900,008 | 7/1972 | Balle et al. | 260/29.4 UA |
| 3,412,054 | 11/1968 | Milligan et al. | 260/29.2 TN |
| 3,479,310 | 11/1969 | Dieterich et al. | 260/29.2 TN |
| 3,640,924 | 2/1972 | Hermann et al. | 260/29.2 TN |
| 3,655,627 | 4/1972 | Hutzler et al. | 260/29.2 TN |
| 3,736,216 | 5/1973 | Hermann et al. | 260/29.2 TN |
| 3,781,238 | 12/1973 | Helm | 260/29.2 TN |
| 3,849,360 | 11/1974 | Farah et al. | 260/29.2 TN |
| 3,870,684 | 3/1975 | Witt et al. | 260/29.2 TN |
| 4,046,729 | 9/1977 | Scriven et al. | 260/29.2 TN |
| 4,066,591 | 1/1978 | Scriven et al. | 260/29.2 TN |

OTHER PUBLICATIONS

Dieterich et al., Agnew. Chem., 9:1, pp. 40–50 (1970).
Dieterich et al., Journal of the Oil and Colour Chemists Association, 53, pp. 363–379 (1970).

*Primary Examiner*—Harold D. Anderson
*Attorney, Agent, or Firm*—Bernard & Brown

[57] ABSTRACT

There are disclosed aqueous colloidal dispersions of tertiary amine salts of urea-urethane polymers of triamine-containing polyamines and isocyanate-terminated, urethane prepolymers having carboxylic groups. The urea-urethanes have sufficient tertiary amine neutralized, carboxylic groups to provide stable, aqueous dispersions having infinite dilutability with water, and the solids of the amine-neutralized dispersions are essentially of colloidal size. Carboxylic groups are supplied by polyol reactants employed in making the prepolymers. The colloidal, urea-urethane polymers may be stably dispersed in the aqueous medium, even in the absence of substantial amounts of cosolvents, and are useful in, for instance, coating compositions to provide water-resistant coatings.

67 Claims, No Drawings

AQUEOUS COLLOIDAL DISPERSIONS OF TERTIARY AMINE SALTS OF UREA-URETHANE POLYMERS AND METHOD FOR MANUFACTURE

This application is a continuation-in-part of my copending application Ser. No. 729,091, filed Oct. 4, 1976, now abandoned.

This invention relates to novel, stable, aqueous, colloidal dispersions of urea-urethane polymers and to processes for their manufacture. The urea-urethane polymers can be derived by the triamine-containing polyamine-extension of isocyanate-terminated, urethane prepolymers which contain tertiary amine-neutralized, carboxylic groups. The urea-urethane dispersions of this invention are infinitely dilutable with water and are suitable for use in, for instance, coating compositions and provide water-resistant coatings. The solids of the dispersions are essentially of colloidal size, and the dispersions may be fairly clear or only slightly opaque in appearance.

Urea-urethanes have found widespread use in coatings for fabrics, plastics, wood, metal, and the like, due to their advantageous properties such as their good chemical resistance, abrasion-resistance, toughness, elasticity and durability, and their ability to cure rapidly. Conventionally, urea-urethane coatings have been applied as solutions in, for instance, polar or aromatic hydrocarbon solvents. When the urea-urethanes are of certain types, they may be compatible with aliphatic hydrocarbon solvents. When the coating is being dried, or cured, these solvents vaporize into the atmosphere as an economic loss and, quite importantly, the vaporous solvents may pollute the atmosphere.

Aqueous, urea-urethane coating compositions are, therefore, particularly desirable due to the low cost and availability of water. Moreover, aqueous coating compositions are advantageous since the evaporation of water into the atmosphere has little, if any, adverse effect on the environment, whereas conventionally employed organic solvents may be toxic, odoriferous, or photochemically-sensitive, and thus, may be smog-formers in the daylight atmosphere due to photochemical oxidation. Furthermore, water which is readily available can be used to thin the water-based coating compositions and can be used in clean-up operations. However, urea-urethanes generally are not compatible with water unless special ingredients and/or particular steps of manufacture are employed in their synthesis.

One approach to provide water-dispersible, polyurethane-containing compositions has been through the use of emulsifiers. This procedure generally suffers from the disadvantages that the dispersions are relatively unstable and the resultant films are water-sensitive.

Milligan et al., disclose in U.S. Pat. No. 3,412,054 water-dilutable polyurethanes made by incorporating in the urethane polymer, carboxylic acid groups which are reacted with ammonia or amines to provide hydrophilic, carboxylic acid salt groups on the polymer. These ion-containing polymeric materials, or ionomers, are not infinitely dilutable. The patentees disclose the use of an organic cosolvent to permit dilution up to about 5 percent resin solids, without the resin separating from the dispersion to a significant extent.

Scriven et al. in U.S. Pat. No. 4,066,591, issued Jan. 3, 1978, and in U.S. Pat. No. 4,046,729, issued Sept. 6, 1977 disclose that chain-extended, high molecular weight polyurethanes are very difficult to disperse satisfactorily in water and even then require a high percentage of ionic salt groups which impart disadvantageous properties to coatings made from the polyurethanes. U.S. Pat. No. 4,066,591 relates, among other things, to polyurea-urethanes prepared by diamine chain extending an isocyanate (NCO)-containing prepolymer which is substantially free of reactive hydrogen. The functionality of the NCO prepolymer-forming reactants, as well as of the chain extender, is carefully controlled in order to realize high molecular weight, ungelled products. U.S. Pat. No. 4,066,591 does not disclose the use of triamine extending agents, rather, the patent emphasizes that its chain extenders do not have an average functionality of greater than two.

U.S. Pat. No. 4,046,729 discloses water-diluted polyurea-urethanes that are prepared by the diamine extension of partially-reacted, isocyanate (NCO)-containing prepolymers that contain a high percentage of "highly active hydrogens." It is disclosed that the use of such prepolymers containing active hydrogen permits incorporation of curing agents into the polymer compositions to provide thermosetting products.

In accordance with the present invention, there are provided non-gelled, stable, aqueous dispersions of triamine, especially diamine/triamine, extended, urea-urethane polymers that are infinitely dilutable with water, and their solids are essentially colloidal in size. The colloidal dispersions are relatively clear as compared with urethane emulsions or latexes. The appearance of the colloidal dispersions may be from slightly opaque to relatively clear, and may approach, if not reach, the appearance of a solution. The rheological properties of the colloidal dispersions generally resemble those of a true solution. Such dispersions can be readily formed with only mild agitation even with prepolymer compositions having relatively high viscosity, i.e., above about 10,000 centipoises, at ambient or slightly elevated dispersion temperatures, e.g., up to about 45° C. Accordingly, less solvent need be employed. Products with higher solids contents can be prepared, and the need for high temperature dispersion to reduce viscosity is minimized.

Although the urea-urethane polymer dispersions of this invention are infinitely dilutable with water, they can form cured films having good resistance to water and organic solvents. The urea-urethane polymers may be fully polymerized such that no further reactions need occur during their curing. The films can cure at room temperature, and thus may be described as low energy-consuming materials, and they may be relatively non-polluting since little, if any, organic volatile material need be present in the composition. Apparently, when the dispersions are cured as films, cross-linking occurs due to the use of the triamine-containing extending agent, and the resulting coatings have further enhanced organic solvent resistance and other desirable properties with respect to hardness, elongation and tear resistance. The urea-urethane compositions of this invention may have a relatively neutral pH, thus, a wide selection of pigments can be used without having compatibility problems with the dispersion, and the polymers need not be subjected to high pH conditions which may otherwise tend to promote hydrolysis of the polymer chain.

The urea-urethane polymers of this invention can be made by reacting an aqueous dispersion of a tertiary amine-neutralized, isocyanate-terminated urethane prepolymer with triamine-containing polyamine, especially both triamine and diamine. The isocyanate-terminated urethane prepolymer is formed by the reaction of diisocyanate and polyol, at least a portion of which has at least one carboxylic group which is relatively non-reactive with isocyanates. A portion or all of the carboxylic groups of the urea-urethane is neutralized with tertiary amine groups to provide a polymer which can have a relatively neutral pH in an aqueous dispersion, e.g., having a pH of less than about 11, preferably less than about 10. The urea-urethane polymers have an average particle size in the colloidal size range, e.g., less than about 0.1 micron.

The isocyanate-terminated, urethane prepolymers employed in this invention can be made by the reaction of diisocyanates with urethane-forming polyols. At least a portion of the polyol component has at least one carboxylic acid group

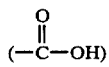

or carboxylate ion group

per molecule which is relatively non-reactive with isocyanates. Both the carboxylic acid group and carboxylate ion group are referred to herein as carboxylic groups. Thus, the isocyanate groups of the diisocyanate react preferentially with the hydroxyl groups of the polyol molecule to provide a polymer structure with pendant carboxylic groups available for quarternary salt formation with tertiary amines. The carboxylic group-containing prepolymer is reacted with tertiary amine in an amount which enhances the water-dispersability of the tertiary amine-neutralized, urea-urethane polymers formed in accordance with this invention. The increase in water-dispersability thereby provided is sufficient for the tertiary amine-neutralized polymer to be infinitely dilutable by water, and the amount is adequate for the tertiary amine-neutralized, urea-urethane to be in the form of a stable, colloidal dispersion. Thus, in the aqueous dispersion the amount of ionized carboxylic group

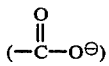

available from the neutralized carboxylic group in salt form is generally at least about 0.8, e.g., about 0.8 to 6, weight percent of the neutralized, urea-urethane polymer on a non-solvent, non-aqueous basis, i.e., solids basis, preferably at least about 1.3 weight percent, say about 1.3 to 6 weight percent. For example, the amount of carboxylic group-containing polyol reacted may provide unneutralized, prepolymer solids having an acid value of at least about 17, preferably at least about 20 on a solids basis. Polyurea-urethane films made from prepolymers having acid values above about 50 or 60 may have less resistance to water. The prepolymers are often in an essentially liquid state, either as the polymer per se or dissolved in a solvent, at ambient temperatures, e.g., about 15° to 45° C., and the prepolymers are generally stable at ambient temperatures in the sense that they will not cure to an insoluble gel for a significant period of time, e.g., for at least about two weeks, unless further contacted with water, polyol, polyamine or other active-hydrogen-containing material. The prepolymers contain a minor amount of free isocyanate groups and generally have a free isocyanate group content of at least about 0.5, say up to about 15, weight percent or somewhat more on a nonsolvent basis. For instance, the free isocyanate group content may be at least about 1, and preferably is about 1 to 8, weight percent based on the urethane prepolymer solids.

The carboxylic group-containing polyols used in accordance with this invention are advantageously dihydroxy materials, and the dihydroxy-containing alkanoic acids are preferred. The carboxylic group-containing polyol can be reacted, without any significant reaction between the carboxylic groups and the diisocyanate component. Among the polyols which may be employed are those which have relatively unreactive free carboxylic acid groups, for instance, the alkanoic acids having one or two substituents on the alpha carbon atom. The substituent may be, e.g., a hydroxyl or alkyl group, for example, an alkylol group. The polyol has at least one carboxylic group, and generally has 1 to about 3 carboxylic groups, per molecule. The polyols which may conveniently be employed in accordance with this invention frequently have 2 to about 20 or more, preferably 2 to about 10, carbon atoms such as tartaric acid, the α,α-dialkylol alkanoic acids, e.g., having alkylol groups of 1 to about 3 carbon atoms, and the like. A preferred group of dihydroxy alkanoic acids are the α,α-dimethylol alkanoic acids which may be represented by the structural formula

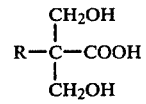

wherein R is hydrogen or alkyl, e.g., lower alkyl, say, of 1 to about 8 carbon atoms. The α,α-dimethylol alkanoic acids which may be employed in accordance with this invention include 2,2-dimethylol acetic acid, 2,2-dimethylol propionic acid, 2,2-dimethylol butyric acid, 2,2-dimethylol pentanoic acid, and the like. A preferred dihydroxy alkanoic acid is 2,2-dimethylol propionic acid. The carboxylic group-containing polyol may frequently provide at least about 3 to say up to about 90, or more, preferably about 5 to 50, weight percent of the total polyol component in the prepolymer.

Polyols, in addition to the carboxylic group-containig polyol, may be employed in making the prepolymers, and these additional polyols include those having a molecular weight of at least about 400. Generally, the average molecular weight of these additional polyols will not exceed about 5,000, and is preferably about 400 to 4,000. These additional polyols may comprise up to about 95 weight percent of the total polyol comprising the carboxylic group-containing polyol and additional polyol. The aliphatic polyols include those represented by the formula:

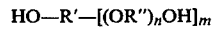

in which R' is a hydrocarbon radical, preferably saturated, and R" is an alkylene radical of 2 to 4, preferably 3 to 4, carbon atoms. R' preferably has 2 to 12, advantageously 2 to 4, carbon atoms. The letter n represents a number up to about 50, depending on the molecular weight desired, while the letter m is at least say up to 1 to 2 or more, and is preferably 1, i.e., the polyol is a diol. Among the higher molecular weight polyols which may be employed with advantage are the polyether polyols of up to about 5,000 or more molecular weight, such as the polyoxyethylene polyols, polyoxypropylene polyols and polyoxybutylene polyols. The latter materials include the straight chain polyoxybutylene glycols often referred to as tetramethylene ether glycols, as well as the branched-chain polyoxybutylene glycols, for instance, made from 1,2- and 2,3-butylene oxides. It is preferred that the polyethers not contain excessive amounts of ether groups since the resulting polymers tend to swell in water.

Preferred polyols which may be employed include the polyester polyols of up to about 5,000 or more, e.g., about 400 to 4,000 or 5,000, molecular weight which may be derived, for instance, from a polyol and dicarboxylic acid or hydroxy carboxylic acid or lactone. The dicarboxylic acid or hydroxy carboxylic acid may often have from 3 to about 30, preferably 4 to about 12, carbon atoms, and may be aliphatic, alicyclic, aromatic or mixed structures of these types. The dicarboxylic acid, hydroxy carboxylic acid, or lactone may be substituted with groups which do not deleteriously affect the production of the desired urea-urethane products. Exemplary dicarboxylic acids and anhydrides which may be employed in this invention are orthophthalic acid, orthophthalic acid anhydride, isophthalic acid, terephthalic acid, adipic acid, cyclohexane-1,4-dicarboxylic acid, succinic acid, succinic acid anhydride, sebacic acid, dimers of olefinically-unsaturated monocarboxylic acids, such as linoleic acid dimer, and the like, and their mixtures. Minor amounts of carboxylic acids having three or more carboxylic groups may also be present during formation of the polyester polyols. The hydroxy carboxylic acids which may be employed as a reactant in providing a hydroxy-terminated polyester polyol include, for instance, hydroxycaproic acid, hydroxybutyric acid, hydroxydecanoic acid, hydroxystearic acid, and the like. Useful lactones include caprolactone, butyrolactone, and the like. The polyols which may be employed in preparing the polyester polyols are often low molecular weight polyols, e.g., diols having, say, up to about 20 carbon atoms. Exemplary of the polyols which may be employed to prepare polyester polyols are 1,6-hexanediol, neopentyl glycol, trimethylol propane, ethylene glycol, 1,4-butanediol, 1,4-cyclohexane dimethanol, and the like.

The polyol component used in making the prepolymers employed in the present invention may contain low molecular weight polyol to enhance the hardness of the urea-urethane films. The low molecular weight polyol may often have a molecular weight of up to, say, about 400, e.g., about 60 to 400, and can contain aliphatic, alicyclic, or aromatic groups. Frequently, the low molecular weight polyol, when employed, is at least about 1, preferably about 2 to 30, weight percent of the overall polyol component. Among the advantageous low molecular weight polyols are those having up to about 20 carbon atoms per molecule, for instance, ethylene glycol, 1,2-propanediol, 1,3-propanediol, 1,4-butanediol, 1,3-butylene glycol, trimethylol propane, 1,4-cyclohexane dimethanol, 1,6-hexanediol, bisphenol A (2,2-bis(4-hydroxypheneyl)propane), hydrogenated bisphenol A (2,2-bis(4-hydroxycyclohexyl)propane), and the like, and mixtures thereof.

The essentially hydrocarbon diisocyanates which are useful in preparing the prepolymers employed in this invention are preferably the aliphatic and alicyclic diisocyanates. While aromatic diisocyanates may be employed as the diisocyanate component, they are generally less preferred in applications in which yellowing due to the effects of ultraviolet light, may be undesirable, or where hydrolytic stability is important. The diisocyanates can contain noninterfering groups, e.g., aliphatic hydrocarbon radicals such as lower alkyl or other groups, having substantially nonreactive hydrogens as determined by the Zerewitinoff test, J. Am. Chem. Soc., 49, 3181 (1927). The diisocyanate often has at least 6 carbon atoms and usually does not have more than about 40 carbon atoms. Diisocyanates of about 8 to 20 carbon atoms in the hydrocarbon group are preferred. Suitable diisocyanates include 2,4-toluene diisocyanate; 2,6-toluene diisocyanate; 1,4-cyclohexane diisocyanate; dicyclohexylmethane 4,4'-diisocyanate; xylene diisocyanate; 1-isocyanato-3-isocyanatomethyl-3,5,5-trimethylcyclohexane; hexamethylene diisocyanate; methylcyclohexyl diisocyanate; 2,4,4-trimethylhexylmethylene diisocyanate, and the like. The aliphatic and alicyclic diisocyanates employed in the process of this invention and the products made therefrom generally exhibit good resistance to the degradative effects of ultraviolet light. The polyisocyanate component used to form the prepolymers may contain a portion of polyisocyanates having more than two isocyanate (NCO) groups per molecule providing the urethane prepolymer compositions are not unduly deleteriously affected.

The isocyanate-terminated polyurethane prepolymer reaction products employed in the present invention can be made by reacting an excess of diisocyanate with polyol. The amounts of reactants can be reacted simultaneously, or alternatively, the diisocyanate can be reacted with part or all of one or more of the polyols prior to the reaction with remaining portion of these materials. Stepwise mixing of the diisocyanate with polyols may be used to enhance temperature control and/or produce a blocked copolymer rather than a random copolymer. The reaction temperatures for making the various urethane prepolymers are often up to about 150° C., with about 50° to 130° C., being preferred. Advantageously, the ratio of NCO in the isocyanate to OH in the urethane-forming polyol(s) on an equivalent basis ranges from about 1.2 to 2, preferably from about 1.2 to 1.7. The prepolymer-forming reaction is preferably continued until there is little, if any, unreacted hydroxyl functionality remaining. Preferably, the free isocyanate content of the prepolymer is about 1 to 8 percent of the prepolymer solids. The reaction may be conducted in the presence of a catalyst such as organo-tin compounds, tertiary amines, and the like; however, this is generally not necessary, and it is often preferred to conduct the reaction without a catalyst. As noted above, variations in the nature and amounts of polyol and polyol mixtures used in the preparation of the compositions of this invention can be made to provide polymers exhibiting desired characteristics.

The urethane prepolymers can be prepared in the presence of a solvent which is essentially inert to the reaction. The solvents are generally organic and may be comprised essentially of carbon and hydrogen with or without other elements such as oxygen or nitrogen. While it may not be necessary to employ a solvent during formation of the urethane prepolymer, the use of a solvent may be desirable to maintain the reactants in the liquid state as well as permit better temperature control during the reaction by serving as a heat sink and, if desired, as a refluxing medium. The solvent employed should not contain active hydrogen as determined by the Zerewitinoff test. Solvents which may be employed include dimethylformamide, esters, ethers, ketoesters, ketones, e.g., methyl ethyl ketone and acetone, glycol-ether-esters, chlorinated hydrocarbons, aliphatic and alicyclic hydrocarbon pyrrolidones, e.g., N-methyl pyrrolidones, hydrogenated furans, aromatic hydrocarbons, and the like, and mixtures thereof. The amount of solvent employed, if any, can vary widely. The amount of solvent employed should be sufficient to provide a prepolymer solution having a sufficiently low viscosity to enhance the formation of the urea-urethane dispersion of this invention, however, the solutions may be successfully employed in forming the dispersions even though the viscosity of the solution is relatively high at the temperature of dispersion. Such viscosities may be well above 10,000 centipoises, e.g., be at least about 12,000 or 15,000 centipoises, and only mild agitation need be employed to form the dispersion, even in the absence of an emulsifying agent. Often about 0.01 to 10 parts by weight of solvent, preferably about 0.02 to 2 parts by weight of solvent, per part by weight of the total diisocyanate and polyol in the prepolymer can be used. The presence of a solvent for the urea-urethane, however, is not necessary to provide a stable, infinitely dilutable aqueous dispersion. Often, when solvent is employed during the preparation of the urethane prepolymer and/or the urea-urethane polymer it is desirable to remove at least a portion of the solvent from the aqueous dispersion of polymer. Advantageously, the solvent to be removed from the dispersion has a lower boiling point than water and thus can be removed from the dispersion by, for example, distillation. The removal of the low boiling solvent is desirably conducted under conditions which are not deleterious to the urea-urethane polymer such as vacuum distillation or thin film evaporation conditions. A solvent having a higher boiling point than water such as dimethyl formamide, N-methyl-pyrrolidone, and the like, which is a solvent for the urea-urethane polymer may be employed, in which case, the higher boiling solvent is generally retained in the aqueous dispersion of urea-urethane polymer to enhance the coalescence of the urea-urethane polymer particles during film formation.

The isocyanate-terminated prepolymer contains carboxylic groups. In the urea-urethanes of the present invention at least a portion of these groups are reacted with amines having at least one salt-forming tertiary amine group, e.g., aliphatic tertiary amine groups, preferably a trialkyl amine, having 3 to about 12 carbon atoms, such as trimethyl amine, triethyl amine, methyl diethyl amine, N,N-dimethylethanol amine, tripropyl amine, and the like. Thus, the alkyl groups of the amine may be substituted with, for instance, hydroxy groups, as in the alkanolamines such as the dialkylmonoalkanol, alkyldialkanol and trialkanol amines. Triethyl amine, and N,N-dimethyl ethanol amine are preferred amines. Desirably, the tertiary amine employed is relatively volatile. The tertiary amines react to form quaternary amine salts of the carboxylic groups of the polymer which salts are generally more hydrophilic than free acid groups. The quaternary amine salts of the carboxylic groups of the urethane prepolymer and the urea-urethanes made therefrom are preferably capable of decomposing during the formation of, e.g., coatings, of the urea-urethanes of this invention with the tertiary amine being volatilized and removed from the coating. Thus, the resulting urea-urethane coatings may be less sensitive to water than the corresponding quaternary amine salt group-containing materials.

The tertiary amine salts of the carboxylic groups are provided in amounts such that the aqueous, neutralized urea-urethane polymer dispersion is infinitely dilutable with water and is a colloidal dispersion. The salt-forming tertiary amine is, therefore, generally provided in a mole ratio to the carboxylic groups of the prepolymer of about 0.3:1 to 2:1, say 0.3:1 to 1.3:1, or more, preferably about 0.5:1 to 2:1. The neutralized salt of the polymer may have salt groups other than the tertiary amine salt groups present, e.g., a minor amount of alkali metal salt, such as the lithium, sodium, and/or potassium salts, on a molar salt basis. Urea-urethane films containing unduly large amounts of alkali metal salts are generally less water resistant than films prepared from urea-urethane dispersions of more highly tertiary amine-neutralized polymers. Therefore, if the urea-urethane contains alkali metal salt groups such alkali metal salt groups should not be in amounts sufficient to unduly detract from the properties of the ultimate film.

The tertiary amine may, for instance, be reacted with urethane prepolymers having free carboxylic acid groups. The tertiary amine is perferably added to the prepolymer in the presence of a sufficient amount of water to form a dispersion of the neutralized prepolymer in the water. The water may conveniently be added in admixture with the tertiary amine. Alternatively, the tertiary amine may be added before the addition of the water. Frequently, the water is provided in a weight ratio to urethane prepolymer solids of about 0.2:1 to 5:1, preferably about 0.5:1 to 3:1, on a total weight basis. A solvent for the prepolymer may also be present when the tertiary amine and water are added to provide a viscosity suitable to facilitate the addition of the tertiary amine and water. Advantageously, the solvent is water-miscible and at least a portion of the solvent is low boiling, i.e., has a lower boiling point than water. Often, the solvent may be provided in a weight ratio to the urethane polymer of at least about 1:5, and generally for economic reasons the weight ratio of the solvent to the urethane polymer is less than about 5:1.

The reaction between the tertiary amine and the carboxylic groups of the urethane prepolymer may occur at ambient temperature; however, lower or elevated temperatures of, e.g., about 15° to 50° C. may conveniently be employed. The prepolymer mixture can advantageously be agitated and the addition of the tertiary amine and water conducted over a period of time, e.g., intermittently or continuously for about 0.5 to 30 minutes. If the water, or a portion of the water, of the dispersion is added after the tertiary amine or tertiary amine and water mixture, the prepolymer mixture is advantageously agitated during such water addition to assist in providing the dispersion of the prepolymer in the aqueous mixture. The contact of the isocyanate-terminated urethane polymer with water should not be unduly excessive prior to chain extension with the polyamine since water is reactive with free isocyanate groups, e.g., it may be desirable to initiate the addition of the polyamine more or less immediately, say within about 15 minutes or less, after adding water, to avoid undue reaction of the prepolymer with water.

The urea-urethane products of this invention are made by chain extension of the urethane prepolymers with triamine-containing polyamine, especially both triamine and diamine. Enough triamine must be present in the chain-extending polyamine to provide an average of substantially more than 2, e.g., at least about 2.2, amine nitrogen atoms having active hydrogen per molecule of polyamine reacted. Advantageously, the average active amine hydrogen functionality of free polyamine mixture ranges between about 2.2 to 2.8 amine nitrogen atoms having active hydrogen per molecule of polyamine, and preferably is about 2.3 or 2.4 to 2.6, e.g., about 2.5 active hydrogen containing amine nitrogen atoms per molecule of polyamine. The chain extending polyamine can include components which are essentially hydrocarbon polyamines having 2 or 3 amine groups providing reactive hydrogens in accordance with the Zerewitinoff test, e.g., primary and secondary amine groups, and having 1 to about 40 or more carbon atoms, preferably about 2 to 15 carbon atoms. Preferably, the polyamine components each have at least 2 primary amine groups. Both the diamine and triamine components of the polyamine may contain other substituents which do not have hydrogen atoms as reactive with isocyanate groups as the primary or secondary amine groups. The polyamine components may have, for instance, an aromatic, aliphatic or alicyclic structure. Among the useful components of the polyamine are ethylene diamine, propylene diamine, 1,4-butylene diamine, piperazine, 1,4-cyclohexyldimethylamine, hexamethylene diamine, trimethylhexamethylene diamine, menthane diamine, 4,4'-diaminodicyclohexylmethane, diethylenetriamine, dipropylenetriamine, dibutylenetriamine, etc. Preferred polyamines are the alkyl or cycloalkyl diamines and triamines, e.g., 1-amino-3-aminomethyl-3,5,5-trimethyl cyclohexane, diethylene triamine, and the like. The urethane prepolymer can be reacted with one or more of these polyamines to obtain the urea-urethane product so long as the polyamine reactant has an average of substantially more than 2 amine nitrogen atoms having active hydrogen per molecule of polyamine.

The polyamine component used herein can consist essentially of all triamine. Preferably, however, the polyamine component consists essentially of both diamine and triamine. Advantageously, the polyamine component is a mixture of diamine and triamine. The amounts of the urethane prepolymer and polyamine reactants and the reaction conditions are generally chosen such that substantially all of the isocyanate content of the prepolymer is reacted on a weight basis with the primary or secondary amine groups; however, a small portion of the isocyanate content may react with the water. Thus, an approximately stoichiometric amount of amine or slightly less is preferably used. When a stoichiometric excess of the polyamine is employed, urea-urethane polymers are formed having amine nitrogen atoms with reactive hydrogens. Polymers of this type can be thermally cured to provide films having especially good resistance to alcohols. Polymer dispersions of this type are described and claimed in copending patent application of David G. Hangauer, Jr. and Herbert M. Schroeder, Ser. No. 772,850, filed Feb. 28, 1977. It is preferred that the polyamine not be in an unduly large excess in the presence of the urethane prepolymer since a lower molecular weight urea-urethane polymer may be formed which is less desirable.

Chain extension of the urethane prepolymer is frequently conducted in an aqueous medium such that the dispersion of the urea-urethane polymer in water is directly formed. The chain extension can be conducted at elevated, reduced or ambient temperatures. Convenient temperatures are from about 5° to 95° C. or more, preferably from about 10° to about 45° C. Elevated or reduced pressures may be employed, however, the chain extension reaction is normally conducted at approximately ambient pressure. Generally, it is desired to continue the reaction until a good yield of the desired urea-urethane polymer is obtained. Preferably, the polyamine(s) employed in the method of this invention reacts rapidly with the urethane prepolymer such that undue reaction of water with the isocyanate groups is avoided.

The polyamine is preferably gradually added to the reaction medium which contains the urethane prepolymer in order to prevent the occurrence of localized high concentrations of the added reactant which may lead to forming urea-urethanes having an unduly broad molecular weight range. When employing high concentrations of the reactants in the reaction medium it is preferred that the combination of the polyamine and prepolymer be less rapid than when the reactants are less concentrated. For instance, when the reactants are in relatively low concentration in the reaction medium and the medium is well agitated, the polyamine and prepolymer can be quickly combined. Frequently, the rate of addition of the polyamine will be over a period of about 0.5 to 30 minutes. The rate of addition of the polyamine may, in part, depend upon the degree of agitation of the reaction medium and the speed with which the polyamine is dissipated in the reaction medium. The polyamine may be added in essentially undiluted form or in admixture with an organic solvent or with water. Preferably, the polyamine is in an essentially aqueous solution. A convenient weight ratio of water or other solvent to polyamine may be employed and often the weight ratio of water or other solvent to polyamine is about 1:1 to 5:1.

The urea-urethane polymer may have a minor amount of cross-linking and still form a continuous film under normal curing conditions. An unduly large amount of cross-linking, however, is undesirable since the polymer particles may be too stiff to form a continuous film under normal curing conditions. The cross-linking of the urea-urethane polymer can be provided by the use of either or both of at least a trifunctional prepolymer or at least a trifunctional polyamine. The trifunctional or higher prepolymers may be produced from a trifunctional or correspondingly higher polyol and/or polyisocyanate during the formation of the urethane prepolymer from polyol and diisocyanate. Often, the cross-linking polyols are aliphatic and have about 3 to 12, preferably about 3 to 6, carbon atoms, per molecule, although their polyether or polyester polyol derivatives may have significantly higher molecular weights. It is generally preferred, however, that any trifunctional or higher component be provided at least to a major extent by the polyamine since excessively cross-linked urethane prepolymers may be highly viscous and require excessive amounts of solvent to provide a solution of desirable viscosity for further processing or may form an intractable gel which is unsuitable for further processing. As noted, a preferred trifunctional polyamine is diethylene triamine.

The urea-urethane polymer which is formed in accordance with the present invention is generally in the lower colloidal particle size range, e.g., having an average particle size up to about 0.1 micron, and the urea-urethane polymer preferably has an average particle size of up to about 0.05 micron, e.g., about 0.001 to 0.05 micron. Colloidal dispersions of the urea-urethane polymer in water may appear essentially or nearly transparent and thus may be essentially in solution-like form. The colloidal particle sizes of the urea-urethane polymers of this invention enhance stability of the polymer dispersions in aqueous compositions and are infinitely-dilutable in aqueous media, even in the absence of a cosolvent. With smaller polymer particles, the tendency to form high gloss films may be increased and the ability of the dispersion to accept pigments is generally enhanced. Colloidal size particles are not readily filtered from the dispersion.

The urea-urethane polymers of this invention are advantageously employed as aqueous coating compositions. Frequently, the aqueous compositions have a relatively neutral pH, say, about 6 to 11, preferably about 7 to 10. The coating compositions may contain ingredients other than water and the urea-urethane polymer such as a higher boiling, e.g., slower evaporating than water, solvent for the urea-urethane polymer, particularly solvents which may be miscible with water such as dimethyl formamide, N-methyl pyrrolidone, alkoxyalkanols, alkyl diethers, and carboxylic esters derived from alkoxyalkanols. The higher boiling solvent is advantageously provided in a minor amount sufficient to aid the coalescence of the polymer particles after the bulk of the water has been evaporated. Essentially complete coalescence of the polymer particles tends to provide desirably glossy finishes and enhance physical properties, e.g., strength of the film. Frequently, the slower evaporating solvent is provided in a weight ratio to urea-urethane solids of up to about 1:2, preferably about 1:3. The slower evaporating solvent may be introduced during the formation of the prepolymer or urea-urethane polymer, or it can be added to the aqueous dispersion of the urea-urethane polymer.

The composition may contain other ingredients for coating compositions including plasticizers to modify the properties of the resultant urea-urethane, pigments, colorants, dyes, emulsifying agents, surfactants, thickeners, heat stabilizers, levelling agents, anti-cratering agents, fillers, sedimentation inhibitors, ultraviolet-light absorbers, and the like. The additives such as heat stabilizers, ultraviolet-light absorbers, etc., may be intimately dispersed in the reaction mixture and apparently thereby become an integral part of each individual urea-urethane particle when formed. Alternatively, the additive may be introduced after the urea-urethane polymer has been formed, in which case the additive can be incorporated on the surface of the polymer or dispersed in the aqueous medium.

The urea-urethane polymers of this invention, including the higher molecular weight urea-urethane polymers, can comprise a large amount of the aqueous compositions without the composition having an undesirably high viscosity, and the viscosity of the aqueous dispersion may be lower than that of analogous urea-urethane polymers dissolved in organic solvents. The nonvolatile content of the coating compositions of this invention may often range from about 5 to 70, preferably about 10 to 40 or 50 weight percent of the composition. The nonvolatile content of the compositions may vary depending upon the nature of the coating and the manner in which the coating is to be applied, e.g., by spraying, brushing, transfer coating, etc. The aqueous compositions are infinitely dilutable with water. Advantageously, water can be employed to thin the compositions, and the washing of application equipment and spatterings is facilitated.

The urea-urethane polymers of this invention can also be used in applications other than coatings, e.g., in casting to form thin films, as adhesives, and the like. The film-type products generally have a thickness of up to about 100 mils or more, and often the coating compositions have a thickness of up to about 10 mils. The urea-urethanes can be formed into various materials or articles of greater cross-sectional dimensions, and can be employed in the various ways known in the art for utilization of these types of materials. The coatings, due to the use of water in the compositions, can be dried at temperatures of, say, about 10° C. or more. Advantageously, relatively low temperatures can be employed, however, elevated temperatures may also be used, e.g., temperatures of up to about 350° C. or more to accelerate removal of water and organic solvent, if present.

The invention will be illustrated further by the following examples. All parts and percentages are by weight unless otherwise indicated. All viscosity measurements are at 25° C.

EXAMPLE 1

A mixture of 72 parts 2,2-dimethylolpropionic acid, 845 parts melted polytetramethylene ether glycol (about 2,000 molecular weight, hydroxyl number 56.7), and 210 parts methyl ethyl ketone is prepared, and the ingredients are blended under nitrogen for about one-half hour. To the mixture which is being agitated is added 274 parts of trimethylhexamethylene diisocyanate, and the mixture is subsequently heated to 85° to 90° C. under a nitrogen blanket for about three hours to form an isocyanate-terminated urethane prepolymer. The prepolymer is cooled and then diluted with 558 parts acetone. A diluted, isocyanate-terminated urethane prepolymer solution is obtained having a free NCO content of 1.1 percent by weight, an acid value of 16.2, a non-volatile content of 62 percent by weight, and a viscosity of about 43 Stokes.

One-thousand-four-hundred-thirteen parts of the prepolymer is charged to a reaction vessel and agitated. A mixture of 34 parts N,N-dimethylethanolamine and 1,390 parts water is then gradually added to the agitating prepolymer over a ten minute period, and the temperature is maintained between 29° to 32° C. Within one to two minutes after the completion of the addition of the N,N-dimethylethanolamine and water, a mixture of 15 parts 1-amino-3-amino-methyl-3,5,5-trimethylcyclohexane and 6 parts diethylenetriamine and 141 parts water is gradually added to the prepolymer dispersion over a four to five minute period, and the temperature is maintained between 32° to 35° C. to form a colloidally dispersed urea-urethane polymer. The acetone and methyl ethyl ketone are then distilled from the dispersion to yield a very stable, essentially organic solvent-free, aqueous colloidal polyurea-urethane ionomer dispersion with the following analysis: nonvolatile content of 39 percent by weight, pH of 9.2, and a viscosity of about 113 Stokes. The colloidal dispersion is only slightly opaque and is infinitely dilutable with water. Films from this product can be cured under ambient conditions and are of very high gloss and have a Shore hardness of A55. The polymer is an elastomer exhibiting an ultimate tensile strength of about 1,200 psi and elongation at break of about 900 percent. The films have very good resistance to water spotting.

EXAMPLE 2

A mixture of 148 parts 2,2-dimethylolpropionic acid, 615 parts melted polytetramethylene ether glycol (about 2,000 molecular weight, hydroxyl number 56.7), and 536 parts methyl ethyl ketone is prepared, and the ingredients are blended under nitrogen for about one-half hour. To the mixture which is being agitated is added 484 parts 4,4-methylene bis(cyclohexyl isocyanate), and the mixture is subsequently heated to 85° to 90° C. under a nitrogen blanket for about four hours to form an isocyanate-terminated urethane polymer. The prepolymer is cooled and then diluted with 441 parts acetone. A diluted, isocyanate-terminated urethane prepolymer solution is obtained having a free NCO content of 1.6 percent by weight, an acid value of 30.8, a nonvolatile content of 57 percent by weight, and a viscosity of about 21 Stokes.

One-thousand-two-hundred-sixty-eight parts of the prepolymer is charged to a reaction vessel and agitated. A mixture of 56 parts N,N-dimethylethanolamine and 1,385 parts water is then gradually added to the agitating prepolymer over a ten minute period, and the temperature is maintained between 30° to 33° C. Within one to two minutes after the completion of the addition of the N,N-dimethylethanolamine and water, a mixture of 20 parts 1-amino-3-aminomethyl-3,5,5-trimethylcyclohexane and 8 parts diethylenetriamine and 163 parts water is gradually added to the prepolymer dispersion over a four to five minute period, and the temperature is maintained between 33° to 36° C. to form a colloidally dispersed urea-urethane polymer. The acetone and methyl ethyl ketone are then distilled from the dispersion to yield a very stable, essentially organic solvent-free, aqueous colloidal polyurea-urethane ionomer dispersion with the following analysis: nonvolatile content of 32 percent by weight, pH of 9.1, and a viscosity of about 214 Stokes. The colloidal dispersion has an almost perfectly clear appearance and is infinitely dilutable with water. Films from this product can be cured under ambient conditions to yield very high gloss films, and optimum physical properties are attained when the films are cured at elevated temperatures. Twenty-five mil dry films cured at 70° C. overnight attain a Shore hardness of D 70 and exhibit an ultimate tensile strength of about 5,000 psi and elongation at break of about 360 percent. A 3 mil wet film attains its maximum physical properties when cured at 90° C. for less than one-half hour. The heat cured films have very good resistance to water spotting.

EXAMPLE 3

A mixture of 74 parts 2,2-dimethylolpropionic acid, 740 parts of a neopentyl glycol adipate polyester (about 1100 molecular weight, hydroxyl number 101.1), and 221 parts methyl ethyl ketone is prepared, and the ingredients are blended under nitrogen for about one-half hour. To the mixture which is being agitated is added 434 parts 4,4'-methylene bis(cyclohexyl isocyanate), and the mixture is subsequently heated to 85° to 90° C. under a nitrogen blanket for about three hours to form an isocyanate-terminated urethane prepolymer. The prepolymer is cooled and then diluted with 613 parts acetone. A diluted, isocyanate-terminated urethane prepolymer solution is obtained having a free NCO content of 1.7 percent by weight, an acid value of 16.1, an nonvolatile content of 59 percent by weight, and a viscosity of about 3 Stokes.

Eight-hundred parts of the prepolymer is charged to a reaction vessel and agitated. A mixture of 18 parts N,N-dimethylethanolamine and 786 parts water is then gradually added to the agitating prepolymer over a ten minute period, and the temperature is maintained between 25° to 31° C. Within one to two minutes after the completion of the addition of the N,N-dimethylethanolamine and water, a mixture of 9 parts 1-amino-3-aminomethyl-3,5,5-trimethylcyclohexane and 4 parts diethylene triamine and 112 parts water is gradually added to the prepolymer dispersion over a four to five minute period, and the temperature is maintained between 31° to 34° C. to form a colloidally dispersed urea-urethane polymer. The acetone and methyl ethyl ketone are then distilled from the dispersion to yield a stable, essentially organic solvent-free, aqueous colloidal polyurea-urethane ionomer dispersion with the following analysis: nonvolatile content of 34 percent by weight, pH of 8.4, and a viscosity of about 164 Stokes. The colloidal dispersion is only slightly opaque and is infinitely dilutable with water. Films from this product can be cured under ambient conditions to yield very high gloss films but optimum physical properties are attained when the films are cured at elevated temperatures. The polymer is a tough elastomeric material.

EXAMPLE 4

A mixture of 144 parts dimethylolpropionic acid, 6 parts trisnonylphenyl phosphite, 1585 parts polycaprolactonediol (mol wt 2000), 715 parts 4,4'-methylene bis (cyclohexyl isocyanate), 18 parts Irganox 1076 Antioxidant and 1050 parts N-methylpyrrolidone are heated at 85°–90° C. for 12 hours. At the end of this time a prepolymer is obtained which has 70% non-volatiles, an NCO content of 1.86%, an acid value of 17.5 and a viscosity of 152 poises.

One thousand parts of the prepolymer so prepared is treated with 27.6 parts of dimethylethanolamine (100% neutralization) and 1174 parts of water, maintaining the temperature at about 30° C. Then a solution of 18.7 parts isophorone diamine (1-amino-3-aminomethyl-3,3,5-trimethylcyclohexane) and 7.5 parts diethylene triamine (average reactive hydrogen amino group functionality is about 2.4 nitrogen atoms per molecule) in 130 parts of water are added over a period of 10 minutes. After agitating for another 10 minutes, the product is filtered.

The aqueous colloidal dispersion obtained exhibits a 31% non-volatile content, a pH of 8.4 and a viscosity of 50 cps.

Free films made from this resin dispersion show the following physical properties:

| | |
|---|---|
| Tensile Strength | 5000 psi |
| Elongation | 480% |
| 100% Modulus | 1000 psi |
| 300% Modulus | 2500 psi |
| Split Tear | 270 pli |
| Shore D Hardness | 40 |

EXAMPLE 5

In a manner similar to Example 4, an aqueous dispersion of a polyurethane lacquer is prepared with the exception that a 1000 molecular weight polycaprolactone diol is used as the polyester diol in place of the 2000 molecular weight diol. The charge for making the prepolymer is as follows:

| Charge | Parts/Wt. |
| --- | --- |
| Dimethylolpropionic Acid | 157 |
| Trisnonylphenyl Phosphite | 5 |
| Polycaprolactone Diol (1000 MW) | 1319 |
| Hylene W [4,4'-methylene bis (cyclohexylisocyanate)] | 964 |
| Irganox 1076 | 17 |
| N-Methyl Pyrrolidone | 1055 |

The resultant prepolymer is 69.5% non-volatiles, has an acid value of 19.1, a viscosity of 273 poises and an NCO content of 2.05%.

The carboxylic group-containing, NCO-containing prepolymer is neutralized, dispersed and chain extended as described in Example I, that is 1000 parts of prepolymer is neutralized with 34.4 parts of triethylamine (100% neutralization) and the neutralized product dispersed in 1175 parts of water. The dispersed prepolymer is chain extended with a solution of 20.8 parts isophoronediamine and 8.4 parts diethylenetriamine in 131 parts of water. (Functionality of polyamine mixture is about 2.4.) An aqueous dispersion exhibiting 30.7% non-volatiles, a pH of 9.4 and a viscosity of 240 cps is obtained.

Free film properties of a clear coating made with this product has the following properties:

| Tensile Strength | 4500 psi |
| --- | --- |
| Elongation | 390% |
| 100% Modulus | 1300 psi |
| 300% Modulus | 2600 psi |
| Tear Strength, Split | 120 pli |
| Shore Hardness | 55 D |

EXAMPLE 6

A polyurethane lacquer is prepared as generally described in Example 4 with the exception that the ratio of short and long chain diol is varied so that a harder final product is obtained. The charge for making the prepolymer is as follows:

| Charge | Parts/Wt. |
| --- | --- |
| Dimethylolpropionic Acid | 269 |
| Trisnonylphenyl Phosphite | 6 |
| Polycaprolactone Diol (2000 MW) | 1118 |
| Hylene W [4,4'-methylene bis (cyclohexylisocyanate)] | 882 |
| Irganox 1076 | 16 |
| N-Methyl Pyrrolidone | 1225 |

The resultant prepolymer is 65.9% non-volatile, has an acid value of 32.1, a viscosity of 444 poises and an NCO content of 1.63%.

The charge for chain extending this prepolymer is as follows:

| Charge | Parts/Wt |
| --- | --- |
| Prepolymer | 1000.0 |
| Dimethylethanolamine | 50.7 |
| Water | 1094.0 |
| Isophoronediamine | 16.6 |
| Diethylenetriamine | 6.7 |
| Water | 122.0 |

The dispersion has a solids content of 29.7%, a viscosity of 650 cps and a pH of 8.1. Free film properties of the polymer are as follows:

| Tensile Strength | 4500 psi |
| --- | --- |
| Elongation | 300% |
| 100% Modulus | 2800 psi |
| 200% Modulus | 3600 psi |
| Split Tear | 180 pli |
| Shore Hardness | 58 D |

It is claimed:

1. A stable, aqueous colloidal dispersion of urea-urethane polymer salt which dispersion is infinitely dilutable with water, and which polymer salt consists essentially of tertiary amine salt of urea-urethane polymer prepared by reaction of carboxylic group-containing, isocyanate-terminated urethane prepolymer and polyamine, said prepolymer being the reaction product of polyisocyanate and polyol having sufficient carboxylic groups which are relatively non-reactive with isocyanate to provide said prepolymer with an acid value of about 17 to 60 on an unneutralized solids basis, said polyisocyanate being selected from the group consisting of aliphatic diisocyanates, alicyclic diisocyanates, toluene diisocyanate and xylene diisocyanate and said polyamine consisting essentially of triamine, wherein said polyamine components have at least two amine groups selected from the group consisting of primary amine groups and secondary amine groups reactive with isocyanate groups, said polyamine having on the average at least about 2.2 amine nitrogen atoms having active hydrogen per molecule of polyamine, said polymer salt having sufficient carboxylic groups in tertiary amine salt form to provide said stable, aqueous, colloidal dispersion.

2. An aqueous dispersion of claim 1 wherein the polyamine has an average of about 2.2 to 2.8 amine nitrogen atoms having active hydrogen per molecule of polyamine.

3. An aqueous dispersion of claim 2 wherein the polyamine consists essentially of triamine and diamine.

4. An aqueous dispersion of claim 3 wherein the diamine consists essentially of 1-amino-3-aminomethyl-3,5,5-trimethylcyclohexane and the triamine consists essentially of diethylene triamine.

5. An aqueous dispersion of claim 2 containing a sufficient amount of organic solvent for the urea-urethane polymer which is slower evaporating than water to enhance the coalescence of the urea-urethane polymer particles.

6. An aqueous dispsersion of claim 2 wherein the carboxylic group content of said urea-urethane in tertiary amine salt form is about 0.8 to 6 weight percent on a solids basis.

7. An aqueous dispersion of claim 6 wherein the tertiary amine salt consists essentially of trialkyl amine salt.

8. An aqueous dispersion of claim 7 wherein the trialkyl amine salt consists essentially of triethylamine salt.

9. An aqueous dispersion of claim 6 wherein the tertiary amine salt consists essentially of dialkyl monoalkanol amine salt.

10. An aqueous dispersion of claim 9 wherein the dialkyl monoalkanol amine salt consists essentially of N,N-dimethyl ethanol amine salt.

11. An aqueous dispersion of claim 2 wherein said prepolymer is prepared from polyol consisting essentially of dihydroxy alkanoic acid.

12. An aqueous dispersion of claim 11 wherein said dihydroxy alkanoic acid consists essentially of α,α-dialkylol alkanoic acid.

13. An aqueous dispersion of claim 12 wherein the carboxylic group content of said urea-urethane in tertiary amine salt form is about 0.8 to 6 weight percent on a solids basis.

14. An aqueous dispersion of claim 13 wherein the α,α-dialkylol alkanoic acid consists essentially of 2,2-dimethylolpropionic acid.

15. An aqueous dispersion of claim 14 wherein the isocyanate-terminated prepolymer has an NCO content of about 1 to 8 weight percent on a solids basis.

16. An aqueous dispersion of claim 15 wherein said tertiary amine salt consists essentially of triethylamine salt.

17. An aqueous dispersion of claim 15 wherein said tertiary amine salt consists essentially of N,N-dimethyl ethanol amine salt.

18. A stable, aqueous, colloidal dispersion of urea-urethane polymer salt which dispersion is infinitely dilutable with water, said urea-urethane polymer consisting essentially of the reaction product of carboxylic acid group-containing, isocyanate-terminated, urethane prepolymer and an approximately stoichiometric amount of polyamine consisting essentially of triamine and diamine, wherein said polyamine components have at least two primary amine groups reactive with isocyanate groups, said polyamine having an average of at least about 2.2 amine nitrogen atoms having active hydrogen per molecule of polyamine, said prepolymer being the reaction product of diisocyanate selected from the group consisting of aliphatic diisocyanates, alicyclic diisocyanates, toluene diisocyanate and xylene diisocyanate, and polyol comprising α,α-dialkylol alkanoic acid and polyether polyol or polyester polyol, said polyol having sufficient α,α-dialkylol alkanoic acid to provide said prepolymer with an acid value of about 20 to 60 on an unneutralized solids basis, said urea-urethane polymer salt having sufficient tertiary amine salt of said carboxylic acid group to form said stable, aqueous, colloidal dispersion.

19. An aqueous dispersion of claim 18 wherein the ratio of NCO in said diisocyanate to OH in said polyol ranges from about 1.2 to 1.7 on an equivalent basis.

20. An aqueous dispersion of claim 19 wherein the polyamine has an average of about 2.2 to 2.8 amine nitrogen atoms having active hydrogen per molecule of polyamine.

21. An aqueous dispersion of claim 20 wherein the polyamine consists essentially of triamine and diamine.

22. An aqueous dispersion of claim 21 wherein the diamine consists essentially of 1-amino-3-aminomethyl-3,5,5-trimethylcyclohexane and the triamine consists essentially of diethylene triamine.

23. An aqueous dispersion of claim 20 wherein said polyether or polyester polyol has a molecular weight of about 400 to 5,000 and is up to about 95 weight percent of said polyol.

24. An aqueous dispersion of claim 23 wherein the carboxylic acid group content of said urea-urethane in tertiary amine salt form is about 0.8 to 6 weight percent on a solids basis.

25. An aqueous dispersion of claim 24 wherein the α,α-dialkylol alkanoic acid consists essentially of 2,2-dimethylolpropionic acid.

26. An aqueous dispersion of claim 25 wherein the tertiary amine salt consists essentially of trialkyl amine salt.

27. An aqueous dispersion of claim 26 wherein said trialkyl amine salt consists essentially of triethylamine salt.

28. An aqueous dispersion of claim 25 wherein the tertiary amine salt consists essentially of dialkyl monoalkanol amine salt.

29. An aqueous dispersion of claim 28 wherein said tertiary amine salt consists essentially of N,N-dimethyl ethanol amine salt.

30. An aqueous dispersion of claim 20 wherein said polyol contains polyol having a molecular weight of less than about 400 in an amount sufficient to increase the hardness of said urea-urethane.

31. An aqueous dispersion of claim 30 wherein the polyamine contains 1-amino-3-aminomethyl-3,5,5-trimethylcyclohexane.

32. An aqueous dispersion of claim 30 wherein the triamine component of the polyamine consists essentially of diethylene triamine.

33. An aqueous dispersion of claim 30 wherein said polyether or polyester polyol has a molecular weight of about 400 to 5,000 and comprises up to about 95 weight percent of said polyol.

34. An aqueous dispersion of claim 33 wherein the carboxylic acid group content of said urea-urethane in tertiary amine salt form is about 0.8 to 6 weight percent on a solids basis.

35. An aqueous dispersion of claim 34 wherein the α,α-dialkylol alkanoic acid consists essentially of 2,2-dimethylolpropionic acid.

36. An aqueous dispersion of claim 35 wherein said tertiary amine salt consists essentially of triethylamine salt.

37. An aqueous dispersion of claim 35 wherein said tertiary amine salt consists essentially of N,N-dimethyl ethanol amine salt.

38. An aqueous dispersion of claim 36 wherein said low molecular weight polyol consists essentially of hydrogenated 2,2-bis(4-hydroxyphenyl)propane.

39. A method for making a stable, infinitely water-dilutable, colloidal aqueous dispersion of urea-urethane polymer salt which comprises adding tertiary amine and water to an isocyanate-terminated prepolymer of polyisocyanate selected from the group consisting of aliphatic diisocyanates, alicyclic diisocyanates, toluene diisocyanate and xylene diisocyanate, and polyol containing sufficient carboxylic group which is relatively non-reactive with isocyanate to provide said prepolymer with an acid value of about 17 to 60 on an unneutralized solids basis, to form an aqueous dispersion of said prepolymer in water as tertiary amine salt, reacting the prepolymer salt dispersion with polyamine consisting essentially of triamine, wherein said polyamine components have at least two amine groups selected from the group consisting of primary amine groups and secondary amine groups, and wherein said polyamine has an average of at least about 2.2 amine nitrogen atoms having active hydrogen per molecule of polyamine to form said urea-urethane polymer salt dispersion containing at least about 0.8 weight percent carboxylic groups in tertiary amine salt form on a solids basis.

40. A method of claim 39 wherein the weight ratio of NCO in said polyisocyanate to OH in said polyol ranges from about 1.2 to 1.7 on an equivalent basis.

41. A method of claim 40 wherein the weight ratio of prepolymer to water is about 0.2:1 to 5:1.

42. A method of claim 41 wherein the prepolymer is dissolved in a water-miscible solvent when said tertiary amine and water are added, said solvent being in an amount sufficient to provide a viscosity suitable to facilitate the addition of the tertiary amine and water.

43. A method of claim 42 wherein at least a portion of said solvent is low boiling and is removed from said dispersion after formation of said urea-urethane polymer dispersion.

44. The method of claim 43 in which said solvent consists essentially of acetone.

45. The method of claim 43 in which said solvent consists essentially of methyl ethyl ketone.

46. A method of claim 43 wherein said polyol of said prepolymer consists essentially of α,α-dialkylol alkanoic acid.

47. A method of claim 46 wherein the α,α-dimethylol alkanoic acid consists essentially of 2,2-dimethylolpropionic acid.

48. A method of claim 47 wherein said tertiary amine consists essentially of trialkyl amine.

49. A method of claim 48 wherein said trialkyl amine consists essentially of triethylamine.

50. A method of claim 47 wherein the tertiary amine consists essentially of dialkyl monoalkanol amine.

51. A method of claim 50 wherein said dialkyl monoalkanol amine consists essentially of N,N-dimethyl ethanol amine.

52. A method of claim 46 wherein said polyol further contains polyester polyol having a molecular weight of about 400 to 5,000.

53. A method of claim 52 wherein the α,α-dimethylol alkanoic acid consists essentially of 2,2-dimethylolpropionic acid.

54. A method of claim 53 wherein said tertiary amine consists essentially of triethylamine.

55. A method of claim 53 wherein said tertiary amine consists essentially of N,N-dimethyl ethanol amine.

56. A method of claim 52 wherein said polyol further comprises polyol having a molecular weight of less than about 400 in an amount sufficient to increase the hardness of said urea-urethane when used.

57. A method of claim 40 wherein the polyamine consists essentially of diethylene triamine and diamine.

58. A method of claim 57 wherein the diamine consists essentially of 1-amino-3-aminomethyl3,5,5-trimethylcyclohexane.

59. The method of claim 40 wherein said polyol consists essentially of α,α-dialkylol alkanoic acid.

60. The method of claim 59 wherein the tertiary amine consists essentially of volatile amine having a total of 3 to about 12 carbon atoms as alkyl or alkanol groups, and said amine is provided in a mole ratio to the carboxylic groups of about 0.5:1 to 2:1.

61. The method of claim 60 wherein said polyol consists essentially of 2,2-dimethylolpropionic acid.

62. An aqueous dispersion of claim 1, 2, 4, 8, 12, 14, 16, 18, 22, 23, 25 or 27 in which said polyisocyanate consists essentially of aliphatic or alicyclic diisocyanate.

63. An aqueous dispersion of claim 62 in which said diisocyanate is dicyclohexylmethane 4,4'-diisocyanate or 1-isocyanato-3-isocyanatomethyl-3,5,5-trimethylcyclohexane.

64. An aqueous dispersion of claim 1, 2, 4, 8, 12, 14, 16, 18, 22, 23, 25 or 27 in which said polyisocyanate consists essentially of toluene diisocyanate.

65. A method of claim 39, 47, 49, 52 or 57 in which said polyisocyanate consists essentially of aliphatic or alicyclic diisocyanate.

66. A method of claim 65 in which said diisocyanate is dicyclohexylmethane 4,4'-diisocyanate or 1-isocyanato-3-isocyanatomethyl-3,5,5-trimethylcyclohexane.

67. A method of claim 39, 47, 49, 52 or 57 in which said polyisocyanate consists essentially of toluene diisocyanate.

* * * * *